United States Patent [19]

Copelin

[11] 3,859,369

[45] Jan. 7, 1975

[54] PROCESS FOR THE PRODUCTION OF 2-METHYL-1,4-BUTANEDIOL

[75] Inventor: Harry B. Copelin, Wilmington, Del.

[73] Assignee: E. I. du Pont de Nemours and Company, Wilmington, Del.

[22] Filed: Sept. 11, 1972

[21] Appl. No.: 287,665

Related U.S. Application Data

[63] Continuation-in-part of Ser. No. 166,317, July 26, 1971, abandoned.

[52] U.S. Cl... 260/635 R, 260/346.1 R, 260/635 A, 260/640
[51] Int. Cl............................................. C07c 31/18
[58] Field of Search...... 260/635 R, 635 A, 346.1 R

[56] References Cited
UNITED STATES PATENTS

| | | | |
|---|---|---|---|
| 2,911,445 | 11/1959 | Friederich | 260/635 R |
| 3,404,188 | 10/1968 | Privette et al. | 260/635 A |
| 3,420,898 | 1/1969 | Van Winkle et al. | 260/635 A |
| 3,467,679 | 9/1969 | Rogers | 260/346.1 R |

Primary Examiner—Joseph E. Evans

[57] ABSTRACT

The invention relates to a novel process for the production of 2-memtyl-1,4-butanediol by the hydroformylation of 1,4-butene diol and hydrogenation of the hydroformylated product, preferably in an aqueous medium. The 2-methyl-1,4-butanediol thus produced can be cyclized to yield 3-methyl tetrahydrofuran, a valuable component in the production of polyethers and polyesters. In the production of the 2-methyl-1,4-butanediol phosphine complexes of rhodium are preferably employed as catalysts to insure high yields.

10 Claims, No Drawings

PROCESS FOR THE PRODUCTION OF 2-METHYL-1,4-BUTANEDIOL

CROSS REFERENCE TO RELATED APPLICATIONS

This application is a continuation-in-part of copending application Ser. No. 166,317, filed July 26, 1971, now abandoned.

BACKGROUND OF THE INVENTION

Various intermediates are utilized to make polyethers and polyesters. Diols such as 2-methyl 1,4-butanediol are valuable components in the production of polyethers and polyesters. The availability of such intermediates is limited, and known processes for their manufacture are expensive. In particular, previous work dealing with the hydroformylation of unsaturated alcohols resulted in very poor yields of carbonylation products due to the tendency of the catalysts employed to isomerize the starting alcohols to aldehydes (Chem. Reviews, Volume 62, page 485). According to this concept, if the starting unsaturated alcohol is isomerized, no hydroformylation takes place. The result is that the 1,4-butene diol reaction product is simply g-hydroxy butyraldehyde which, on hydrogenation, would yield 1,4-butanediol. Notwithstanding the expectation of the art, a unique process has been found for the production of 2-methyl-1,4-butanediol and 3-methyl tetrahydrofuran at high yields.

SUMMARY OF THE INVENTION

This invention relates to a process for the production of 2-methyl-1,4-butanediol at high yields by () hydroformylating 1,4-butene diol with carbon monoxide and hydrogen at a temperature within the range of 50° to 250°C. and at an elevated pressure of less than 10,000 pounds per square inch in the presence of a hydroformylating catalyst, and (2) hydrogenating an aqueous solution of the hydroformylated product.

DESCRIPTION OF THE PREFERRED EMBODIMENTS

In conventional hydroformylation processes, an olefin is reacted with carbon monoxide and hydrogen to produce an aldehyde, which may, if desired, be hydrogenated to yield an alcohol. According to this concept, it would be expected that the hydroformylation of 1,4-butenediol would produce the corresponding dihydroxy aldehyde, which on hydrogenation would yield a triol via the mechanism illustrated in the following equations:

(1)
$HOCH_2CH=CHCH_2OH + CO/H_2 \longrightarrow$ $$\underset{\text{HOCH}_2\overset{|}{\text{CH}}-\text{CH}_2\text{CH}_2\text{OH}}{\overset{\text{CHO}}{}}$$

(2)
$$\underset{\text{HOCH}_2\overset{|}{\text{CH}}-\text{CH}_2\text{CH}_2\text{OH} + H_2 \longrightarrow}{\overset{\text{CHO}}{}}$$

Surprisingly, however, by the process of this invention a novel sequence of reactions occurs which yields a diol. In the process of this invention, 2,3-butene-1,4-diol is reacted with a mixture of carbon monoxide and hydrogen to yield a mixture of compounds, hereinafter called precursors. On further hydrogenation, the precursors yield 2-methyl-1,4-butanediol from which 3-methyl tetrahydrofuran can be obtained by cyclization of the diol by known procedures, if desired. The novel sequence of reactions by which the products of the process of this invention are produced is illustrated in the following equations:

(3) $HOCH_2CH=CHCH_2OH + CO/H_2 \longrightarrow$ Precursors

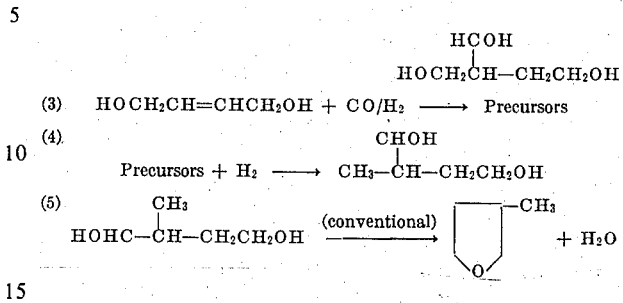

(4) Precursors $+ H_2 \longrightarrow CH_3-\overset{\overset{\text{CHOH}}{|}}{CH}-CH_2CH_2OH$ (5) 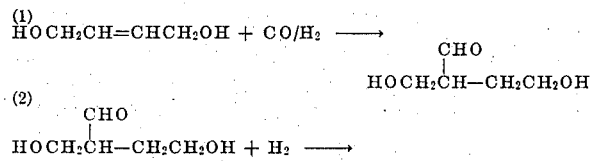

While the exact mechanism by which this unique sequence of reactions occurs is not fully understood, it has been observed that the reactions are very specific in this case to butene diol. It appears that an unstable 2-formyl-1,4-butanediol intermediate is formed which stabilizes to the unsaturated alcohol with loss of a molecule of water. Upon hydrogenation, the double bond is removed and the carbon atom which originally contained an hydroxyl group becomes a pendant methyl group. Care must be exercised in carrying out the reactions of this invention to the extent that no phosphine compounds may be used except those containing phosphine complexed with a metal. The presence of phosphines other than phosphine complexes somehow modifies the catalyst to change the course of the reaction with the result that a triol will be obtained.

The starting material of this invention is 2,3-butene-1,4-diol. This compound is a readily available product of commerce or it can be prepared by any of several well-known procedures. For example, 1,4-butenediol can be obtained by the hydrogenation of butenediol or the hydrolysis of 1,4-dichlorobutene-2.

The hydroformylation reaction is catalyzed by any of the well-known metal phosphine complex hydroformylation catalysts. For example, any of the metal-phosphine complexes disclosed in "Carbon Monoxide in Organic Synthesis", Falbe, (Springer-Verlag 1970), pages 14-25, may be used. The preferred catalysts are phosphine complexes of rhodium, cobalt, iridium and ruthenium. The most preferred catalysts have the formula $RhCOH(Q_3P)_3$ and $RhCOCl(Q_3P)_2$ wherein Q is phenyl; alkyl phenyl such as, for example, tolyl, xylyl, and the like; cyclohexyl; alkyl substituted cyclohexyl, such, for example, methyl, propyl, octyl, and the like, substituted cyclohexyl; and aliphatic radical such as, for example, methyl, butyl, octyl, and the like, or mixtures of any of the foregoing, preferably phenyl. Although the phenyl and cyclohexyl groups may contain any desired alkyl group as a substituent, those alkyl groups having 1 to 20 carbon atoms are preferred. Q may also be any desired normal or isoaliphatic radical, but those aliphatic groups having 1 to 20 carbon atoms are preferred. The $(Q_3P)_2$ group may also be a disphosphine such as, for example, bis-diphenyl phosphino ethane. Other preferred catalysts have the formulae $Co_2(CO)_6(PQ_3)_2$, $IrCOY(PQ_3)_2$, $IrH_3(PQ_3)_3$, and $RuY_3(PQ_3)_3$ wherein Q is as defined above, and Y is a halogen such as, for example, chlorine, fluorine, bromine, iodine, and the like. Mixtures of any of these catalysts may also be used. In any case, the reaction should be carried out in the absence of phosphine compounds other than phosphine-metal complexes. In other words, it is preferred not to have excess phosphine. Some specific preferred catalysts include, for example chlorocarbonylbis(triphenylphosphine)rhodium,
chlorotris(triphenylphosphine)rhodium,
hydridocarbonyltris(triphenylphosphine)rhodium,
hydridocarbonyltris(triphenylphosphine)iridium,
chlorotris(triphenylphosphine)rhodium,
triphenylphosphine cobalt tricarbonyl dimer,
dichlorotris(triphenylphosphine)ruthenium,
bromocarbonylbis(triphenylphosphine)iridium,
chlorocarbonylbis(triphenylphosphine)iridium,
chlorocarbonylbis(triphenylphosphine)rhodium.

While any catalytic quantity of any of the hereindescribed catalysts or mixtures thereof may be used, such quantities generally fall within a range of from about 0.001 to about 5 percent by weight based on the weight of the butenediol and it is generally preferred to use from about 0.01 to 1 percent by weight.

The hydroformylation step of the process of this invention may be carried out at pressures up to 10,000 psig, preferably from about 10 psig to 10,000 psig, most preferably from 200 psig to 1000 psig. It is to be understood that the hydroformylation can be carried out at any pressure within the broad range, the optimum pressure in each case being governed to some extent by the specific charge and catalyst employed, as well as equipment requirements. Temperatures for the hydroformylation reaction will generally range from about 50° to about 250°C., preferably from 75° to 150°C.

The ratio of hydrogen to carbon monoxide used in the hydroformylation step may vary widely. while a mol ratio of hydrogen to carbon monoxide of at least 0.1 is required, any suitable ratios may be employed. Generally, ratios of hydrogen to carbon monoxide of about 0.1 to 10, preferably 1 to about 5, are employed.

The hydroformylation reaction of the invention may be carried out in a solvent, preferably one which is inert with respect to the products or starting materials, if desired. The solvent generally dissolves the catalyst, starting material and products. It is also possible to use the reaction products as the solvent. The latter is a commonly employed industrial expedient. A wide variety of organic solvents such as, for example, aromatics, aliphatics, esters, ethers, nitriles, alcohols, halogenated hydrocarbons, and the like, including benzene, cyclohexane, ethyl acetate, methyl alcohol, ethyl orthoformate, tetrahydrofuran, dioxane, isopropyl alcohol, aliphatic hydrocarbon cuts (saturated), chlorobenzene, methylene chloride, propionitrile, acetonitrile, trimethyl acetonitrile, and the like, and mixtures thereof may be employed.

The hydroformylation step may be carried out batchwise or on a continuous or semicontinuous basis. Typically in a continuous or semicontinuous process, the 2,3-butene-1,4-diol is fed into a reactor in which the temperature and pressure conditions for the hydroformylation reaction are already established. The reactor will also contain the solvent, if any, and the catalyst for the hydroformylation reaction. If a solvent is employed which is water-insoluble, the hydroformylation reaction product can be extracted to recover the precursors. In this procedure the raffinate (solvent and catalyst) can be recycled for further use. Another suitable method by which the hydroformylation product can be isolated involves the addition of water to the hydroformylated products and the removal of most of the solvent by distillation. If this method is used, the solvent which will contain a small amount of product and the catalyst can be recycled for further use.

The hydroformylated products (precursors) thus obtained are then hydrogenated to produce 2-methyl-1,4-butanediol. Preferably, the precursors are dissolved in water prior to the hydrogenation step. The ratio of water to precursors can vary from 0.1 to 20, but 0.5 to 5 is preferred. Any of the conventional procedures well known in the art can be followed for the hydrogenation of the precursors. A variety of suitable hydrogenation catalysts may be used such as, for example, platinum, palladium Raney copper, Raney nickel, nickel on kieselguhr, foraminous nickel, cobalt, and the like, or mixtures thereof. Since nickel catalysts of all types are very effective and inexpensive, these are preferred.

Hydrogen pressures of about 100 psig to 10,000 psig or more can be employed. However, pressures in the range of 1,000 to 4,000 psig are preferred and a range of 1,500 to 2,000 psig is most preferred. The optimum temperature of hydrogenation will depend upon the type of catalyst and catalyst activity. However, the minimum temperature needed for completing the hydrogenation reaction in about 1 to 2 hours is best from a yield standpoint. Since the precursors contain individual compounds which hydrogenate at different rates, the hydrogenation can best be accomplished by operation at a moderate temperature (e.g., 100°C.) over an active nickel catalyst until the hydrogen absorption rate decreases markedly. Thereafter the temperature is increased (e.g., 150°C.) to complete the reaction. Another effective procedure is to gradually program the temperature upwards as the reaction proceeds.

The hydrogenation step is complete when no further hydrogen gas is absorbed. The crude 2-methyl 1,4-butanediol hydrogenation product is then filtered and refined by distillation. If the desired product is 3-methyl tetrahydrofuran, the 2-methyl-1,4-butanediol may be cyclized directly by adding sulfuric acid and distilling at atmospheric pressure. Any of the cyclization procedures well known in the art may be used as desired.

The invention is further illustrated but is not intended to be limited by the following examples in which all parts, ratios and percentages are by weight unless otherwise specified.

EXAMPLE 1

A 300 cc. stainless steel autoclave fitted with a magnetic-type stirring device was charged with 80 gms. of dioxane and 1 gm. of

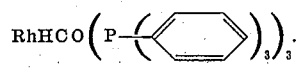

The autoclave was then sealed, the agitator started, and the temperature raised to 105°C. where it was maintained for the duration of the run. After pressurization to 900 psig with a 1:1 CO/H$_2$ mixture, 50 gms. of 2,3-butene diol-1,4 were pumped into the autoclave over a period of 35 minutes. As the pressure fell to 700 psig, more CO/H$_2$ was added to raise the pressure back to 900 psig. After the addition of the butenediol was completed the reaction mixture was stirred for 15 minutes, vented and the contents removed. The crude product was diluted with 300 cc. of water to precipitate the catalyst, filtered, and the filtrate was distilled to remove dioxane and about half of the water. Hydrogenation of the residue (precursors) with 2 gms. of Raney nickel at 100°C. for 1 hour followed by heating at 150°C. for another hour yielded an aqueous solution of approximately 35 gms. of 2-methyl-1,4-butanediol. The nickel catalyst was removed by filtration. The diol was cyclized by adding 2 gms. sulfuric acid and distilling until foaming started (about 150°C. pot temperature). The overhead was redistilled to separate 29 gms. of 3-methyl tetrahydrofuran. Twelve gms. of tetrahydrofuran were also recovered.

EXAMPLE 2

A 300 cc. autoclave was charged with 80 gms. of benzene and 1 gm. of

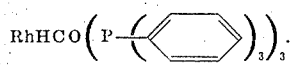

and heated to 130°C. with stirring. The unit was pressurized to 2000 psig with a 0.3 CO/H$_2$ mixture. Additional 1:1 CO/H$_2$ was added as needed to maintain this pressure. Over a 30-minute period 50 gms. of 2,3-butene-1,4-diol were pumped into the autoclave. After the addition of the butene-diol was completed, the reaction mixture was stirred for 10 minutes, cooled and removed from the autoclave. The crude product was diluted with 50 gms. of water and the benzene was removed by distillation. The residue was filtered to remove the catalyst. The remaining aqueous solution of the precursors was then hydrogenated at 150°C. and 2000 psig using 3 gms. of Raney nickel to yield approximately 19 gms. 2-methyl 1,4-butanediol. After cyclization as described in Example 1, 15 gms. of 3-methyl tetrahydrofuran were obtained. In addition, 13 gms. of tetrahydrofuran were recovered.

Although the invention has been described in considerable detail in the foregoing, it is to be understood that such detail is solely for the purpose of illustration and that any of the components and conditions suggested herein as suitable for the practice of the invention may be substituted for its counterpart in the foregoing examples without departing from the spirit and scope of the invention except as set forth in the claims.

What is claimed is:

1. A process for the production of 2-methyl-1,4-butanediol which comprises (1) hydroformylating 1,4-butene diol with carbon monoxide and hydrogen at a mole ratio of hydrogen to carbon monoxide of at least 0.1 and at a temperature of from about 50° to about 250°C. and at an elevated pressure of up to 10,000 psig in the presence of a catalytic amount of a hydroformylating catalyst consisting essentially of a phosphine complex of rhodium, cobalt, iridium or ruthenium, and (2) hydrogenating the hydroformylation reaction product using a conventional hydrogenation procedure.

2. The process of claim 1 wherein the catalyst is RhCOH(Q$_3$P)$_3$ or RhCOCl(Q$_3$P)$_2$ in which Q is phenyl.

3. The process of claim 1 wherein the ratio of hydrogen to carbon monoxide is 0.1 to 10.

4. The process of claim 1 wherein the hydroformylation reaction is carried out in a solvent.

5. The process of claim 1 wherein the hydroformylated reaction product is hydrogenated at a temperature of from 100° to 150°C.

6. The process of claim 1 wherein an aqueous solution of the hydroformylation reaction product is hydrogenated.

7. The process of claim 6 wherein the ratio of water to hydroformylation reaction product is from 0.1 to 20.

8. The process of claim 1 wherein the catalyst is RhCOH(Q$_3$P)$_3$, RhCOCl(Q$_3$P)$_2$, Co$_2$(CO)$_6$(PQ$_3$)$_2$, IrCOY(PQ$_3$)$_3$, IrH$_3$(PQ$_3$)$_3$ or RuY$_3$(PQ$_3$)$_3$ or mixtures thereof wherein Q is phenyl, alkyl phenyl, cyclohexyl, alkyl substituted cyclohexyl, an aliphatic radical and mixtures thereof in which the alkyl groups contain 1 to 20 carbon atoms and the aliphatic radical contains 1 to 20 carbon atoms and Y is a halogen.

9. The process of claim 1 wherein the catalytic amount of the hydroformylating catalyst is 0.001 to 5 percent by weight based on the weight of the butanediol.

10. The process of claim 1 wherein the hydroformylation reaction product is hydrogenated for 1 to 2 hours at a pressure of 100 to 10,000 psig and at a temperature gradually increasing from 100° to 150°C.

* * * * *

UNITED STATES PATENT OFFICE
CERTIFICATE OF CORRECTION

PATENT NO. : 3,859,369
DATED : JANUARY 7, 1975
INVENTOR(S) : HARRY B. COPELIN

It is certified that error appears in the above-identified patent and that said Letters Patent are hereby corrected as shown below:

Column 1, line 58,

" should be

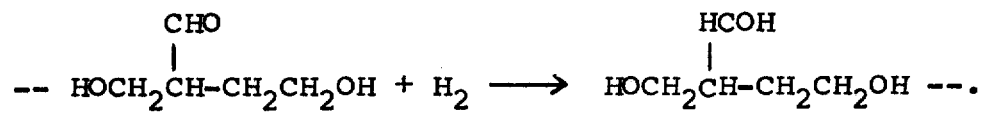

Column 2, line 7,

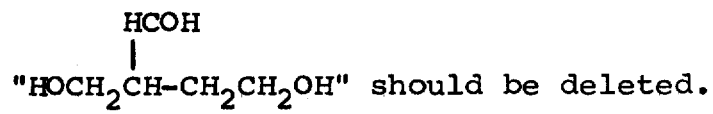

" should be deleted.

Signed and Sealed this twenty-second Day of July 1975

[SEAL]

Attest:

RUTH C. MASON
Attesting Officer

C. MARSHALL DANN
Commissioner of Patents and Trademarks